(12) United States Patent
Haber

(10) Patent No.: US 7,024,987 B2
(45) Date of Patent: Apr. 11, 2006

(54) BAKING ASSEMBLY FOR BATTERED FOOD ITEMS

(76) Inventor: Robert H. Haber, 4470 Dow Ridge, Orchard Lake, MI (US) 48324

( * ) Notice: Subject to any disclaimer, the term of this patent is extended or adjusted under 35 U.S.C. 154(b) by 0 days.

(21) Appl. No.: 10/644,405

(22) Filed: Aug. 19, 2003

(65) Prior Publication Data

US 2005/0039737 A1    Feb. 24, 2005

(51) Int. Cl.
*A47J 37/00* (2006.01)
(52) U.S. Cl. .............. 99/384; 99/374; 99/419; 99/441
(58) Field of Classification Search .......... 99/384, 99/383, 382, 381, 380, 374, 375, 419, 441
See application file for complete search history.

(56) References Cited

U.S. PATENT DOCUMENTS

| | | | | |
|---|---|---|---|---|
| 1,546,347 A | * | 7/1925 | Simmons | 99/373 |
| 1,990,412 A | * | 2/1935 | Merritt | 99/373 |
| 2,282,500 A | * | 5/1942 | Sohn | 99/381 |
| 4,175,483 A | * | 11/1979 | Clark | 99/354 |
| 4,967,650 A | * | 11/1990 | Weigle | 99/374 |
| 5,671,658 A | * | 9/1997 | Macasaet | 99/384 |
| 6,286,418 B1 | * | 9/2001 | Berke et al. | 99/421 A |

\* cited by examiner

*Primary Examiner*—Reginald L. Alexander
(74) *Attorney, Agent, or Firm*—Clark Hill PLC

(57) ABSTRACT

A baking assembly bakes a food item prepared to be baked on a stick with a batter. The baking assembly includes a first heating element including a reservoir for receiving the batter and the food item therein. The reservoir defines a longitudinal axis. A second heating element includes a cavity that complements the reservoir. A hinge secures the first heating element to the second heating element allowing the second heating element to pivot over the first heating element such that the reservoir and the cavity create a heating hollow to bake the food item and the batter therein. A stick retainer receives and retains the stick in an orientation such that the food item is coaxial with the reservoir.

20 Claims, 7 Drawing Sheets

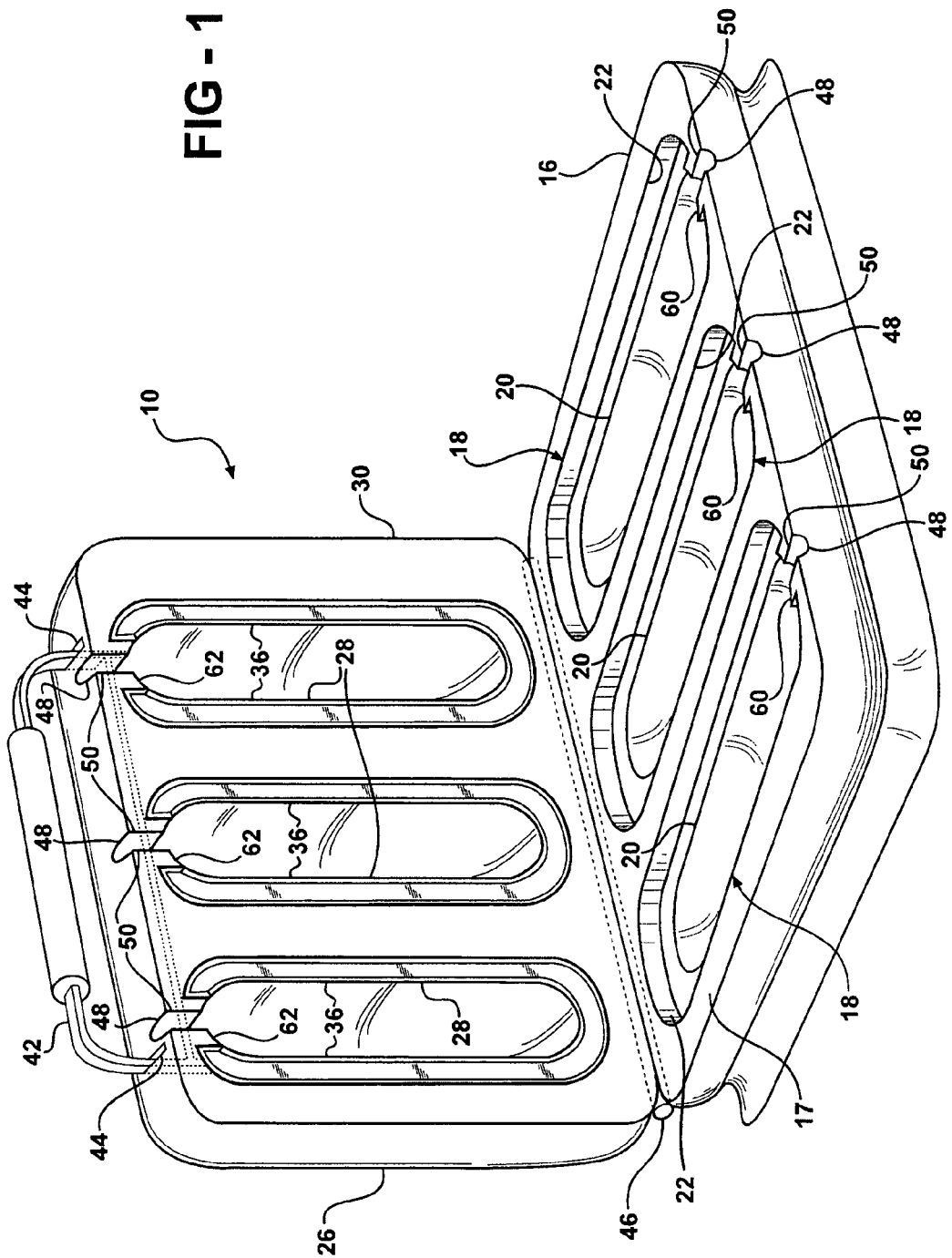

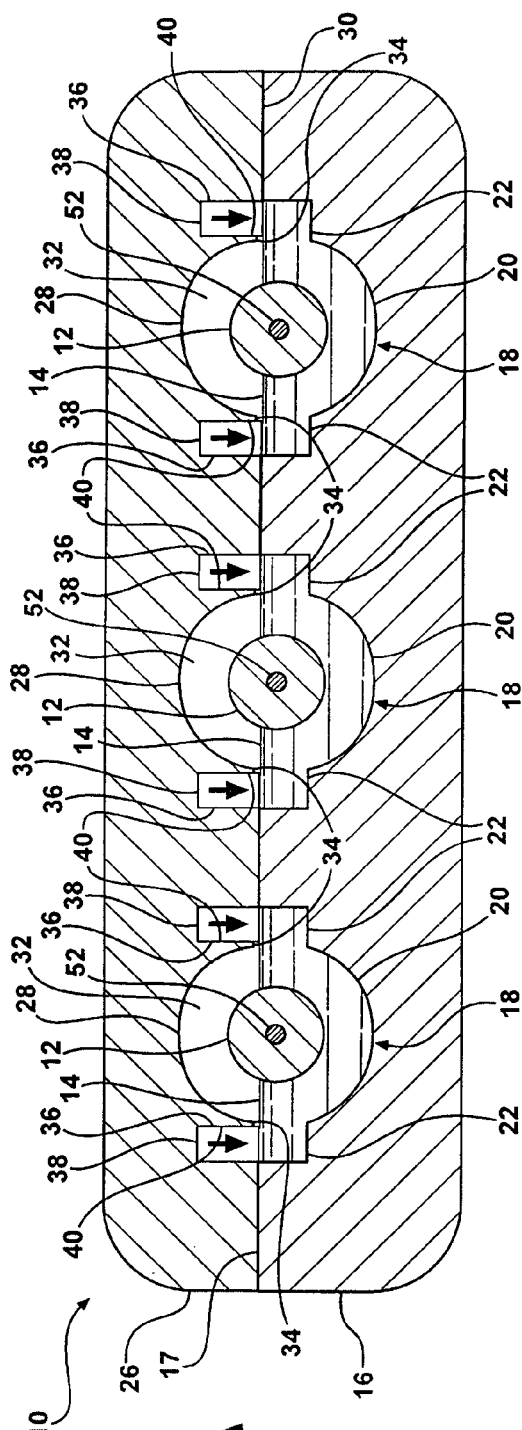
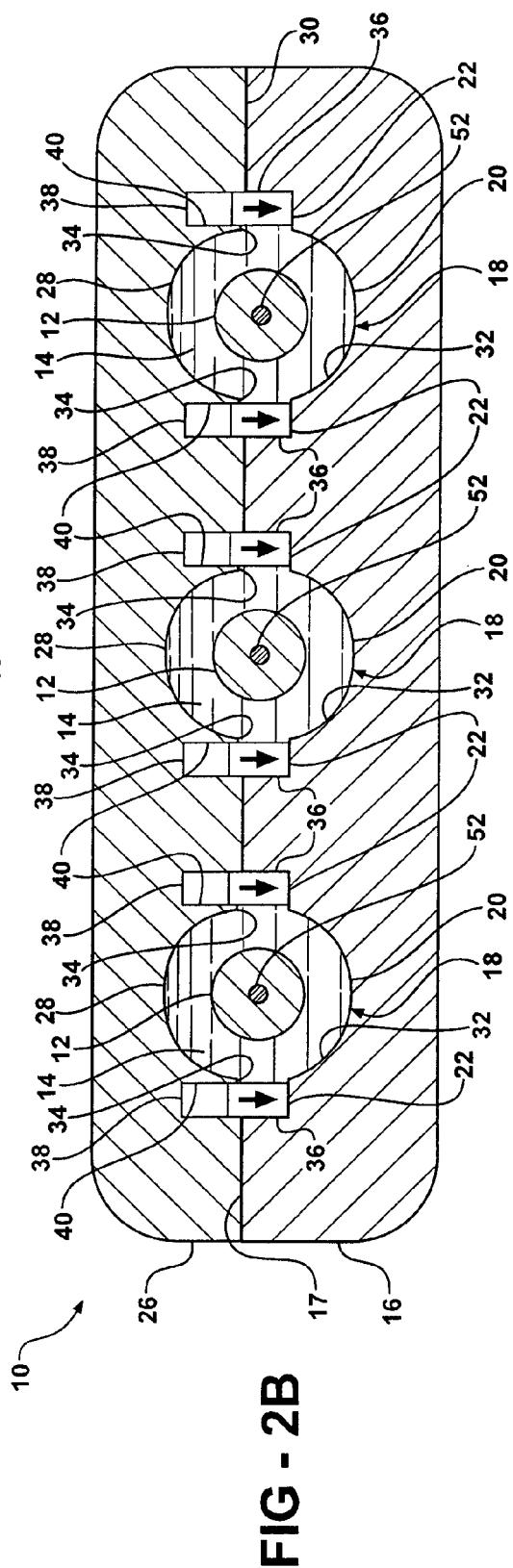
FIG - 2A
FIG - 2B

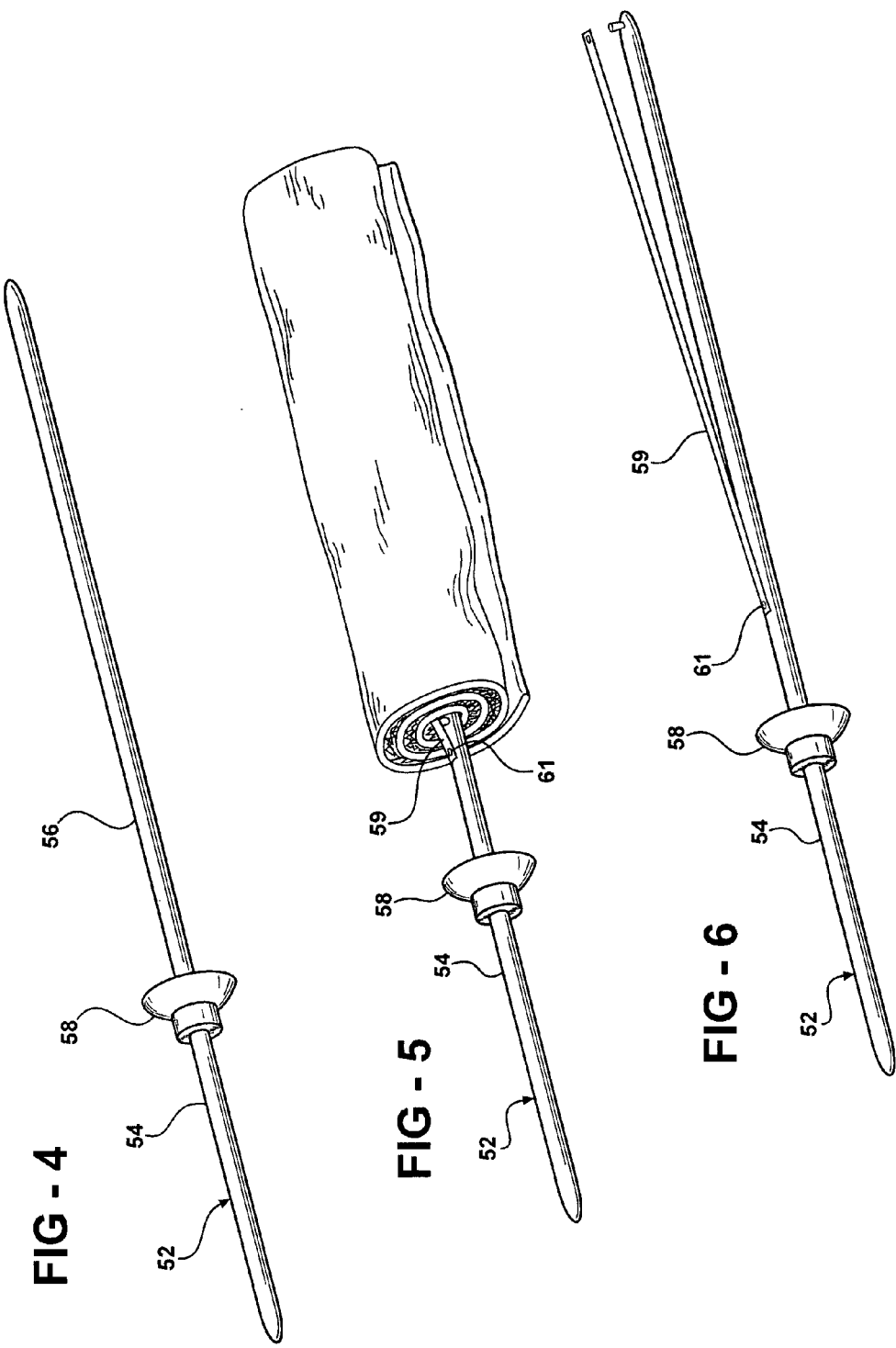

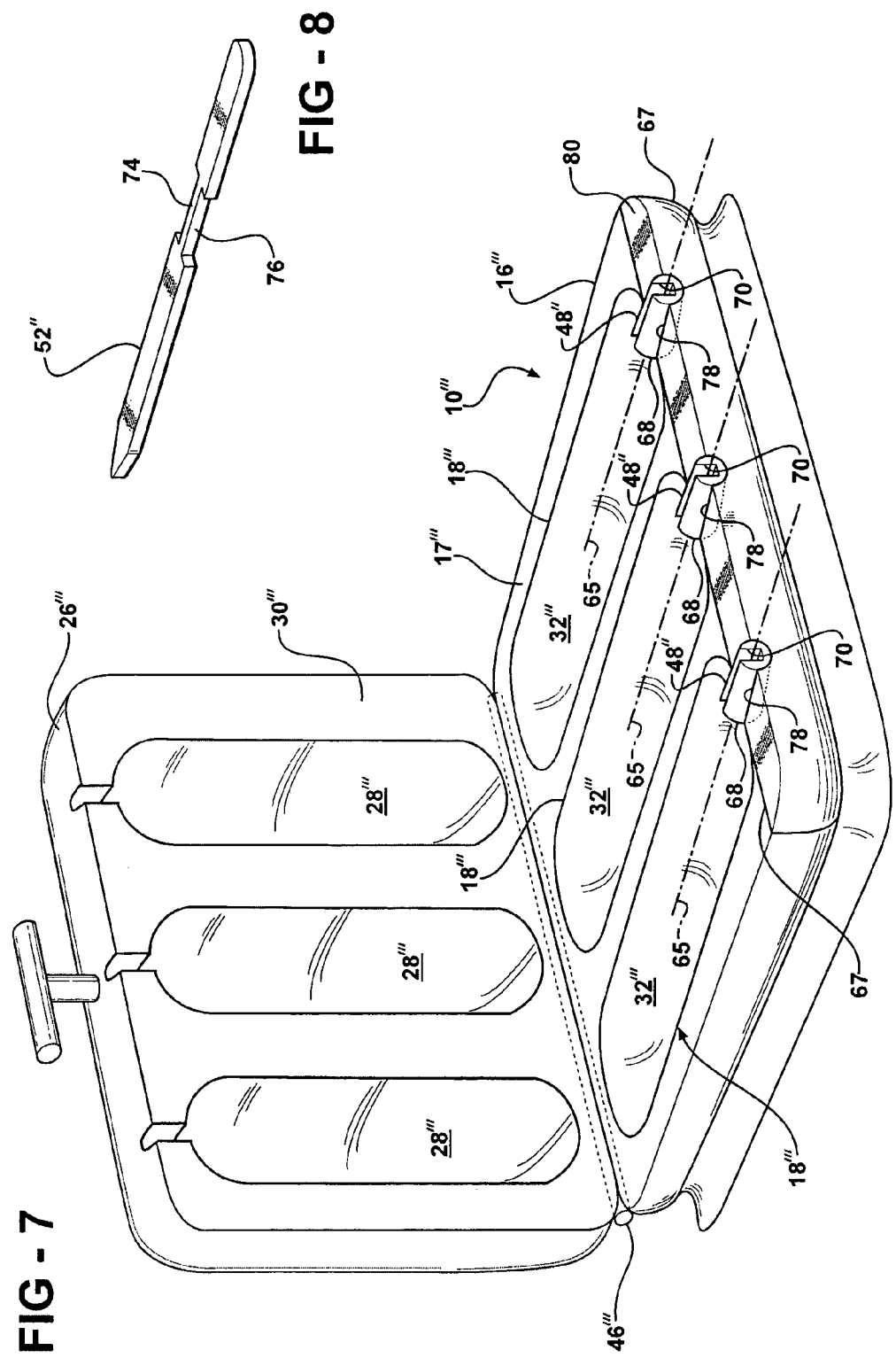

US 7,024,987 B2

BAKING ASSEMBLY FOR BATTERED FOOD ITEMS

BACKGROUND ART

1. Field of the Invention

The invention relates to baking assemblies. More specifically, the invention relates to baking assemblies that cook food items that have been prepared to be baked with a batter.

2. Description of the Related Art

Food items, such as hotdogs, are sometimes prepared by covering the food item in a batter and then dipping it into a deep fryer to fry the food item. Corndogs are typical of this cooking process where the hotdog is placed in a corn batter and then dipped into a deep fryer where the hotdog and the batter are cooked.

Using these types of cooking methods is prohibitive in the home environment because so much oil needs to be heated in order to cook the food that it takes too much time and wastes too much oil for the quantities of food being prepared and consumed in the home environment. Therefore, there is a need to have the ability to prepare such foods in the home environment without requiring the use of vast quantities of oil.

One product produced to provide baked food items that are covered in a batter is produced by Gold Medal Products Company of Cincinnati, Ohio. This company produces a Waffle Dog Baker, part number 5044. This Waffle Dog Baker includes two large plates that have recesses therein to receive hotdogs in batter. When the food and batter are placed in the recesses in the lower plate, an upper plate is pivoted down onto the lower plate. After a certain amount of time, the two plates are pivoted about an axis to allow the batter to flow to the other side and into the cavity of what was the upper plate. This system is a large unit, which would not be desirable to place on any kitchen counter. In addition, the unit becomes very hot and the rotation of the two plates about its axis tends to cause injury. Further, because the plates are rotated about an axis midway through the back side, sticks that are used to hold the hotdogs being baked are broken off if the Waffle Dog Baker is rotated in one of the two directions that it is designed to rotate. Broken sticks easily cause splinters and do not allow the consumer the ability to hold the newly baked corndog a sufficient distance away from the heated food item, which causes discomfort.

SUMMARY OF THE INVENTION

A baking assembly bakes a food item prepared to be baked on a stick with a batter. The baking assembly includes a first heating element including a reservoir for receiving the batter and the food item therein. The reservoir defines a longitudinal axis. A second heating element includes a cavity that complements the reservoir. A hinge secures the first heating element to the second heating element allowing the second heating element to pivot over the first heating element such that the reservoir and the cavity create a heating hollow to bake the food item and the batter therein. A stick retainer receives and retains the stick in an orientation such that the food item is coaxial with the reservoir.

BRIEF DESCRIPTION OF THE DRAWINGS

Advantages of the invention will be readily appreciated as the same becomes better understood by reference to the following detailed description when considered in connection with the accompanying drawings, wherein:

FIG. 1 is a perspective view of one embodiment of the invention in an open state;

FIG. 2A is a front, cross-sectional view of the embodiment of FIG. 1 in a closed state;

FIG. 2B is a front, cross-sectional view of the embodiment of FIG. 1 with the extensions extended downwardly;

FIG. 4 is a perspective view of one embodiment of a skewer;

FIG. 5 is a perspective view of a second embodiment of a skewer with food wrapped thereabout;

FIG. 6 is a perspective view of the second embodiment of the skewer sans food;

FIG. 7 is a perspective view of a third embodiment of the invention;

FIG. 8 is a perspective view of a third embodiment of the skewer sans food;

DETAILED DESCRIPTION OF THE PREFERRED EMBODIMENT

Figure 3:
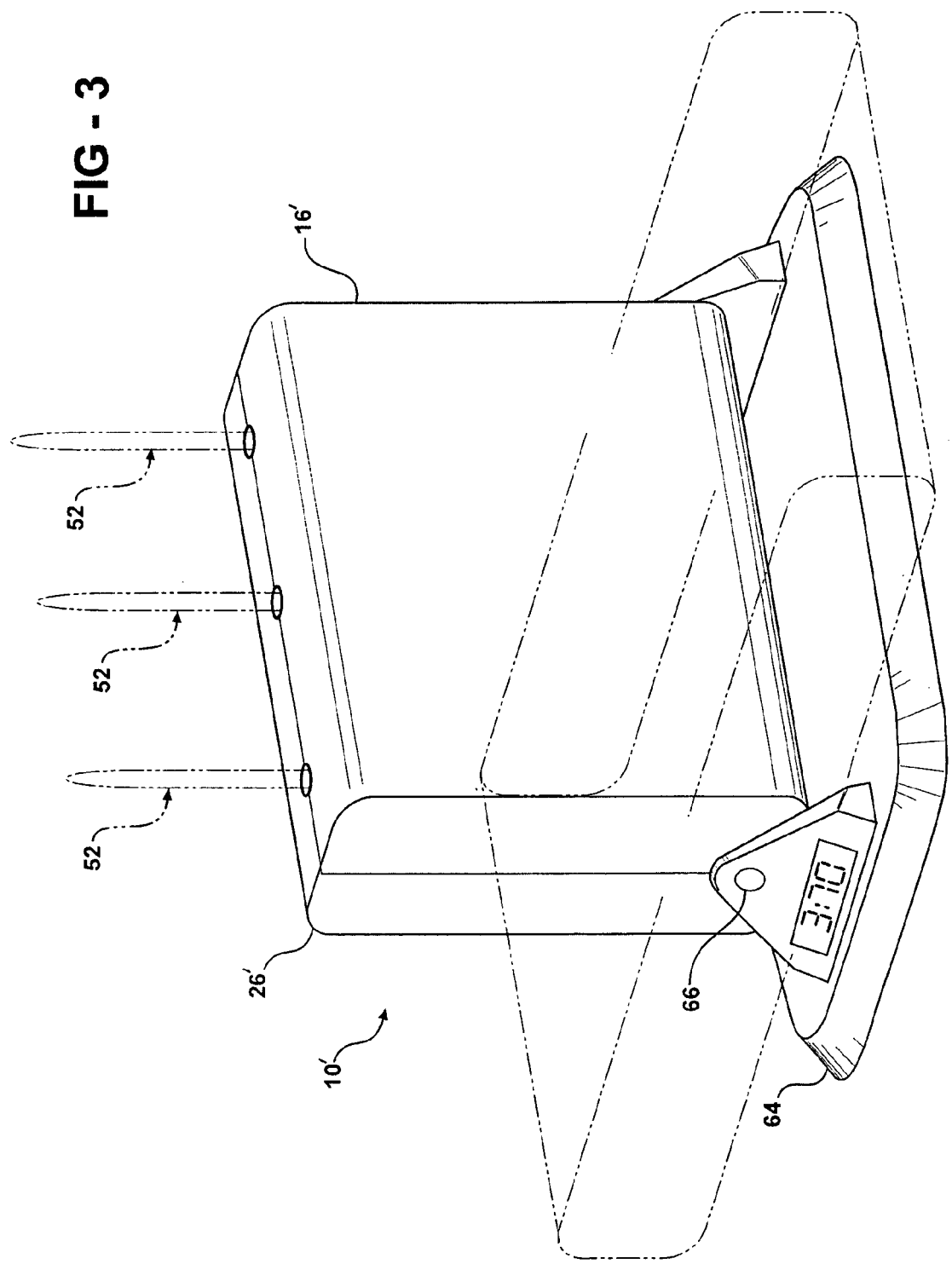
FIG. 3 is a perspective view of a second embodiment of the invention.
Figure 9:
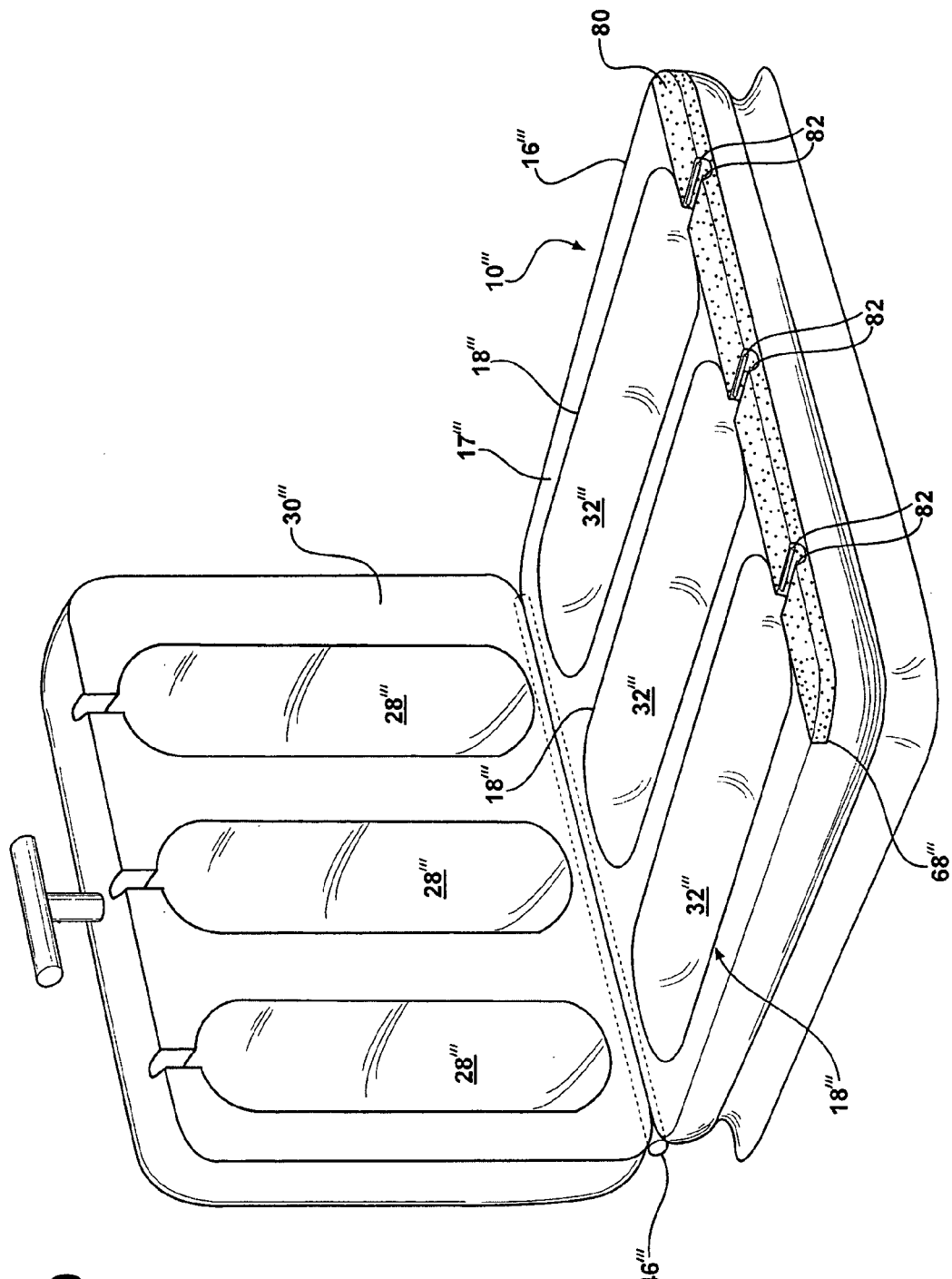
FIG. 9 is a perspective view of a fourth embodiment of the invention.
Figure 10:
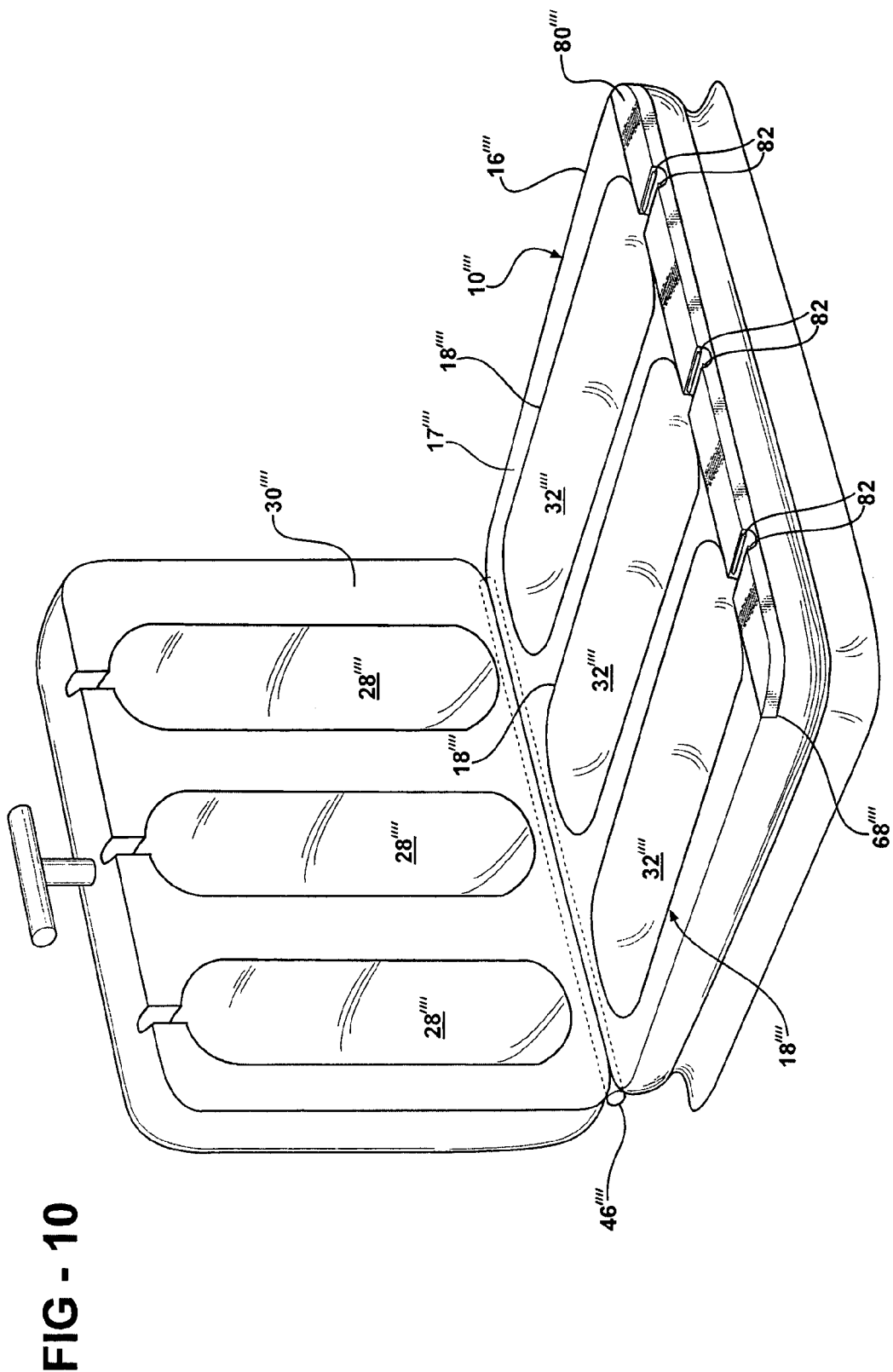
FIG. 10 is a perspective view of a fifth embodiment of the invention.

Referring to FIGS. 1 through 2B, one embodiment of the baking assembly is generally indicated at 10. The baking assembly 10 bakes a plurality of food items 12 with a batter 14. The baking assembly 10 does not use a deep-frying method. It may, however, utilize an oil or lubricant to easily remove the baked foods 12 and batter 14 from the baking assembly 10 once the process is completed. While it is contemplated that the baking assembly 10 bakes a plurality of food items 12 at one time, it should be appreciated that the baking assembly 10 can be made in smaller dimensions such that only a single food item 12 could be prepared at one time.

The baking assembly 10 includes a first heating element 16. The first heating element 16 is a plate that is fabricated from a material that will create and/or transfer thermal energy when an electric current is applied or when a primary heat source (not shown) provides the thermal energy for the first heating plate 16.

The first heating plate 16 includes a top surface 17 and a plurality of reservoirs, generally shown at 18. Each reservoir 18 receives a food item 12 and batter 14 therein. Each of the plurality of reservoirs 18 includes a primary reservoir 20 and a secondary reservoir 22. In the embodiments shown in the figures, each of the reservoirs 18 includes two secondary reservoirs 22 extending along each longitudinal side 24 of the primary reservoir 20. As is shown, the batter 14 fills much of the primary reservoir 20 and the secondary reservoirs 22 when an operator of the baking assembly 10 is preparing to bake a food item 12. The secondary reservoirs 22 are in fluid communication with the primary reservoir 20.

The baking assembly 10 also includes a second heating element or plate 26. Like the first heating plate 16, the second heating plate 26 is fabricated from a material that readily conducts thermal energy. The second heating element 26 includes a plurality of cavities 28 that complement the plurality of reservoirs 18. More specifically, the plurality of cavities 28 complements the plurality of primary reservoirs 20. When a bottom surface 30 of the second heating plate 26 abuts the top surface 17, each of the cavities 28 matches with each of the primary reservoirs 20 to substantially create an enclosure 32 within which the food items 12 and the batter 14 reside while the food items 12 are being baked. Gaps 34 exist in the enclosure 32 and will be described in greater detail subsequently.

The secondary heating plate 26 also includes a plurality of extensions 36. The extensions 36 complement each of the secondary reservoirs 22 in the first heating plate 16. In the embodiments shown, the plurality of extensions 36 are recessed within channels 38 that extend upwardly into the second heating plate 26 above the bottom surface 30 of the second heating plate 26. Extending downwardly from each side of the cavities 28 are two walls 40. Each of these walls 40 extends downwardly almost to the bottom surface 30 and creates the gaps 34.

Each of the extensions is fixedly secured to a handle 42 that extends out from the second heating plate 26. Each of the extensions 36 is also secured to a bar that is pivotally secured to the second heating plate 26. Therefore, the extensions 36 may pivot about an axis defined by the bar with respect to the second heating plate 26. Slots 44 allow the handle 42 to pivot with respect to the secondary heating plate 26.

The baking assembly 10 also includes a hinge 46 that secures the first heating plate 16 to the second heating plate 26. The hinge 46 allows the second heating plate 26 to pivot over the first heating plate 16 such that the extensions 36 may extend into the secondary reservoirs 22. When the second heating plate 26 is pivoted about the hinge 46 over the first heating plate 16 wherein the bottom surface 30 of the second heating plate 26 abuts the top surface 17 of the first heating plate 16, the batter 14 and the food items 12 in each of the reservoirs 18 remain unaffected. When the second heating plate 26 abuts the first heating plate 16, the operator of the baking assembly 10 may force the handle 42 downwardly which forces each of the extensions 36 into each of the secondary reservoirs 22. This forces the batter 14 out of the secondary reservoirs 22 and into the primary reservoir 20 and up into the cavities 28. Therefore, the batter 14 flows out of the secondary reservoirs 22 up and over the food items 12 surrounding the food item 12 allowing the batter 14 to evenly be distributed around the food items 12. Therefore, the extensions 36 extend downwardly into the secondary reservoirs 28 closing off the gaps 34 after the batter 14 is forced through the gaps 34 into the primary reservoir 20 and the cavities 28. Once the food items 12 are baked, the handle 42 may be lifted to raise the extensions 36 and the second heating plate 26 allowing the food items 12 to be removed.

Returning attention to the enclosure 32, an aperture 48 defines a channel 50 that extends from the enclosure 32 out pass the first 16 and second 26 heating plates. The channel 50 provides access to the enclosure 32. Baking sticks 52 extend through the channel 50 and hold the food items 12 in place. The baking sticks 52 are skewers designed to be able to withstand the heat generated or transferred by the first 16 and second 26 heating plates.

The skewers 52 include a handle 54 that is to be used to hold the food items 12 before and after the baking thereof. The skewers 52 also include an elongated rod 56 that is forced into the food items 12 in such instances where the food items 12 are wide enough to be skewered. One example of a food item that may be skewered is a hotdog. A seal 58 extends between the handle 54 and the elongated rod 56 generally perpendicularly thereto. The seal 58 extends out from the skewer 52 for creating a seal closing the channel 50 when the elongated rod 56 and the food item 12 are placed in the baking assembly 10 in such a manner that the handle 54 extends out from the baking assembly 10. Each of the first 16 and second 26 heating plates include a seal receptacle 60, 62 that receives the seal 58 therein. By placing the seal 58 in the seal receptacles 60, 62 upon closing of the second heating plate 26 over the first heating plate 16, the enclosure 32 is sealed from the outside but for the gaps 34 exposing the primary reservoir 20 to the secondary reservoirs 22.

Referring to FIGS. 5 and 6, the skewers 52 include a retainer 59. The retainer 59 is fixedly secured to the elongated rod 56 by a fastener 61. The retainer 59 extends along the elongated rod 56 and allows the food item 12 to be wrapped around the elongated rod 56, if necessary. In FIG. 5, the food item 12 is a slice of ham and cheese that are wrapped around the elongated rod 56 with the end of each slice being retained to the elongated rod 56 by the retainer 59.

Once the food items 12 are baked, the operator of the baking assembly 10 may open the second heating plate 26 by pivoting it away from the first heating plate 16, whereafter the operator may lift the food item 12 away from the baking assembly 10 by grabbing the handle 54 and lifting the skewer 52 and the food item 12 that is baked with a batter 14 away from the baking assembly 10.

Referring to FIG. 3, a first alternative embodiment of the baking assembly is generally indicated at 10', wherein liked prime reference characters represent similar elements as those found in the first embodiment discussed above. In this embodiment, the baking assembly 10' includes a base 64. The base 64 is designed to have a low profile and support the baking assembly 10' on a countertop. The first heating plate 16' is operatively connected to the base 64. The first heating plate 16' includes a plurality of reservoirs wherein each receives a portion of the batter and one of the plurality of food items therein. Unlike the first embodiment discussed above, the plurality of reservoirs only consists of the primary reservoir and does not include secondary reservoirs. The baking assembly 10' also includes a second heating plate 26' that is also operatively connected to the base 64 independent of the first heating plate 16'. The second heating plate 26' includes a plurality of cavities that complement each of the plurality of reservoirs.

The baking assembly 10' includes a pivot 66 that connects the first 16' and second 26' heating plates to the base 64. The pivot 66 allows the heating plates 16', 26' to pivot from a loading position wherein the first heating plate 16' is parallel to the base 64 and a baking position wherein the first 16' and second 26' heating plates are perpendicular to the base. Once the food items 12' and batter 14' are loaded into the first heating plate 16' when the first heating plate 16' is parallel to the base 64, the second heating plate 26' is closed over the first heating plate 16' to create the enclosures. As the baking continues, the heating plates 16', 26' are pivoted about the pivot 66 upwardly to a position perpendicular to the base 64 wherein batter flows around the food item and the batter and the food item continue to bake. The heating plates 16', 26' may be further pivoted about the pivot 66 such that they are again parallel to the base 64 in a position opposite the loading position of the baking assembly 10'. This position and the loading position are shown in phantom in FIG. 3. More specifically, in this continued rotation position, the second heating plate 26' is sandwiched between the base 64 and the first heating plate 16'. This allows the continued flow of the batter to ensure that the food items are completely surrounded by the batter.

Referring to FIG. 7, a second alternative embodiment of the baking assembly is generally indicated at 10", wherein liked double prime reference characters represent similar elements as those found in the first embodiment discussed above. The baking assembly 10" includes a first heating element 16" having a top surface 17" and a plurality of reservoirs 18". Each reservoir 18" receives a food item 12 and batter 14 therein. The reservoirs 18" each define a longitudinal axis 65.

The baking assembly 10" also includes a second heating element or plate 26". Like the first heating plate 16", the second heating plate 26" is fabricated from a material that readily conducts thermal energy. The second heating element 26" includes a plurality of cavities 28" that complement the plurality of reservoirs 18". When a bottom surface 30" of the second heating plate 26" abuts the top surface 17", each of the cavities 28" matches with each of the reservoirs 18" to substantially create an enclosure 32" within which the food items 12 and the batter 14 reside while the food items 12" are being baked.

The baking assembly 10" also includes a hinge 46" that secures the first heating plate 16" to the second heating plate 26". The hinge 46" allows the second heating plate 26" to pivot over the first heating plate 16" such that the extensions 36" may extend into the secondary reservoirs 22". When the second heating plate 26" is pivoted about the hinge 46" over the first heating plate 16" wherein the bottom surface 30" of the second heating plate 26" abuts the top surface 17" of the first heating plate 16", the batter 14 and the food items 12 are baked.

Returning attention to the enclosure 32", an aperture 48" defines a channel 50" that extends from the enclosure 32" out pass the first 16" and second 26" heating plates. The channel 50" provides access to the enclosure 32".

The baking assembly 10" includes a mounting plate 67 that is secured to the first heating plate 16". The mounting plate 66 may be removable from the first heating plate 16" for purposes of cleaning. An intermediate insulator (not shown) may be mounted to the first heating plate 16" to protect the mounting plate 67.

The mounting plate 67 includes a stick retainer 68 disposed each enclosure 32". The stick retainer 68 is pivotally secured to the mounting plate 67 within the channel 50" of the first heating plate 16". The stick retainer 68 defines a recess 70 for receiving a baking stick 52" (FIG. 8) therein. The stick retainer 68 helps keep the baking stick 52" in the proper position and orientation while the food item 12" is being baked. More specifically, the stick retainer 68 maintains the baking stick 52" in a position that is coaxial with the longitudinal axis 65.

The stick retainer 68 is pivotable with respect to the mounting plate 67. The stick retainer 68 pivots about the longitudinal axis 65 allowing the baking stick 52" and the food item 12 to pivot about the longitudinal axis 65. This allows the entire surface of the food item 12 to be coated with batter 14 prior to the baking thereof.

The operation of the second embodiment of the baking assembly 10" includes the step of opening the baking assembly 10" to have access to the reservoirs 18". Batter 14" is then poured into each of the reservoirs 18". It is contemplated that fill lines would mark to what level the reservoirs 18" are to be filled.

Once the batter has been poured, the food items 12" are skewered to the baking sticks 52". The baking sticks 52" include a handle 54" and an elongated rod 56" that are separated by an orientation portion 72. The orientation portion 72 shown in the Figures consists of two flats 74, 76. The flats 74, 76 are received within the recess 70. Once in place, the food item 12" is coaxial with the reservoir 18".

The baking stick 52" is then rotated by rotating the stick retainer 68. The stick retainer 68 includes a rotating mechanism 78 that allows the stick retainer 68 to rotate in place. By rotating the stick retainer 68, the baking stick 52" is locked in the proper position and orientation. In addition, the food item 12" is completely coated with batter 14". This facilitates the proper baking of the batter 14" evenly around the food item 12".

In yet a third alternative embodiment, wherein like triple primed numerals represent elements similar to those of the first embodiment, the stick retainer 68''' does not include a rotating mechanism 78. Instead, the stick retainer 68''' is coated with a non-stick coating 80 that allows the operator of the baking assembly 10''' to turn the stick 52''' easily without a rotating mechanism 78. In a fourth alternative embodiment, the stick retainer 68'''' is fabricated of a non-stick material, such as Teflon®. It should be appreciated by those skilled in the art that any other material capable of withstanding the baking process and is non-toxic may be used in place of Teflon® should it have non-stick properties and be acceptable in the food processing environment.

The baking assembly 10''', 10'''' in either the third or fourth embodiments would not require a specially designed baking stick 52. It could be a cylindrically designed stick with one end being pointed. The baking sticks 52 could be made of plastic or wood, or any other suitable material. The baking assembly 10''', 10'''' would require a snap flange 80 that the baking stick 52''', 52''' would have to pass before it reached the recess 70''', 70''''. The recess 70''', 70'''' would not require flats and could be cylindrical in shape with a diameter slightly larger than the diameter of the baking sticks 52''', 52''''. The snap flange 82 would prevent the baking sticks 52''', 52'''' from tipping due to the weight of the food item 12 secured thereto while allowing the baking sticks 52''', 52'''' to be rotated once in the recess 70''', 70'''' to ensure the even distribution of batter 14 around the food item 12.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A baking assembly for baking a food item prepared to be baked on a stick with a batter, said baking assembly comprising:

a first heating element including a reservoir for receiving the batter and the food item therein, said reservoir defining a longitudinal axis;

a second heating element including a cavity complementing said reservoir;

a hinge securing said first heating element to said second heating element allowing said second heating element to pivot over said first heating element such that said reservoir and said cavity create a heating hollow to bake the food item and the batter; and a stick retainer for receiving and retaining the stick in an orientation such that the food item is coaxial with said reservoir, said stick retainer including a recess for receiving the stick therein, a mounting frame for securing said stick retainer to said first heating element and a rotating mechanism for rotating the stick and the food item secured thereto about said longitudinal axis after the stick is retained in said recess.

2. A baking assembly as set forth in claim 1 wherein said rotating mechanism includes a thumb wheel to rotate the stick and the food item secured thereto.

3. A baking assembly as set forth in claim 2 wherein said stick retainer includes a snap flange disposed adjacent said recess for snapping the stick in said recess to maintain the stick inside said recess and allow the stick to be rotated within said recess.

4. A baking assembly as set forth in claim 2 wherein said stick retainer is coated with a non-stick coating to allow the stick to rotate with said recess.

5. A baking assembly as set forth in claim 2 wherein said stick retainer is fabricated of a non-stick material.

6. A baking assembly for baking a plurality of food items prepared to be baked with a batter, said baking assembly comprising:
   a first heating element including a plurality of reservoirs, each receiving a portion of the batter and one of the plurality of food items therein, each of said plurality of reservoirs including a primary reservoir and a secondary reservoir in fluid communication with said primary reservoir wherein said primary and secondary reservoirs receive the batter therein;
   a second heating element including a plurality of cavities complementing said plurality of primary reservoirs, and a plurality of extensions complementing said secondary reservoirs wherein each of said primary reservoirs and said cavities create an enclosure for the food item and batter when said second heating element and said first heating element are in abutting relation;
   a hinge securing said first heating element to said second heating element allowing said second heating element to pivot over said first heating element such that said extensions extend into said secondary reservoirs forcing the batter out of said secondary reservoirs and into each of said plurality of cavities to cover each of the plurality of food items with the batter as the food items and batter are baked;
   an aperture defining a channel exposing said enclosure; and
   a plurality of sticks each adapted to be secured in said channel prior to the closing of said second heating element over said first heating element, wherein each of said plurality of sticks includes a seal to seal said aperture of said enclosure to prevent the batter from flowing through said channel when said second heating element is being pivoted over said first heating element.

7. A baking assembly as set forth in claim 6 including a bar extending through said second heating element.

8. A baking assembly as set forth in claim 7 wherein said plurality of extensions is fixedly secured to said bar such that said plurality of extensions pivot about said bar between a retracted position inside said second heating element and an extended position out from said second heating element.

9. A baking assembly as set forth in claim 8 including a handle fixedly secured to each of said plurality of extensions for moving said plurality of extensions when said second heating element is pivoted over said first heating element.

10. A baking assembly as set forth in claim 9 wherein said first heating element is a first heating plate.

11. A baking assembly as set forth in claim 10 wherein said second heating element is a second heating plate.

12. A baking assembly for baking a plurality of food items prepared to be baked with a batter, said baking assembly comprising:
   a base including a pivot;
   a first heating plate pivotally connected to said pivot of said base, said first heating plate including a plurality of reservoirs, each receiving a portion of the batter and one of the plurality of food items therein, and a plurality of channels;
   a second heating plate pivotally connected to said pivot of said base independent of said first heating plate, said second heating plate including a plurality of cavities complementing said plurality of reservoirs, said first and second heating plates pivotal about said pivot and each of said first and second heating plates being movable independently of the other and relative to said base such that said first and second heating plates pivot from a loading position wherein said first heating plate is parallel to said base and said second heating plate is perpendicular to said base, a seal position wherein said second heating plate is closed over said first heating plate when said first heating plate is parallel to said base, and a baking position wherein said first and second heating plates are perpendicular to said base.

13. A baking assembly as set forth in claim 12 wherein each of said plurality of reservoirs and each of said plurality of cavities form a plurality of enclosures when said second heating plate abuts said first heating plate.

14. A baking assembly as set forth in claim 13 including an aperture defining a channel exposing said enclosure.

15. A baking assembly as set forth in claim 14 including a plurality of sticks each adapted to be secured in said channel prior to the closing of said second heating element over said first heating element.

16. A baking assembly as set forth in claim 15 wherein each of said plurality of sticks includes a seal to seal said aperture of said enclosure to prevent the batter from flowing through said channel when said second heating element is being pivoted over said first heating element.

17. A skewer for holding a piece of food to be baked in a baking assembly having first and second heating plates defining a channel when the first and second heating plates are abutting each other, said skewer comprising:
   a handle;
   an elongated rod extending out from said handle coaxial thereto, said elongated rod receiving a piece of food thereover; and
   a receiving portion extending between said handle and said elongated rod for being received by a stick retainer allowing said skewer to be secured in the baking assembly coaxially with the channel thereof, wherein said receiving portion includes a plurality of flats extending therealong between said handle and said elongated rod.

18. A skewer as set forth in claim 17 including a retainer for retaining the piece of food against said elongated rod.

19. A skewer for holding a piece of food to be baked in a baking assembly having first and second heating plates defining a channel when the first and second heating plates are abutting each other, said skewer comprising:
   a handle;
   an elongated rod extending out from said handle coaxial thereto, said elongated rod receiving a piece of food thereover; and
   a seal extending out from skewer perpendicular to said handle and said elongated rod for creating a seal closing the channel when said elongated rod and the food are placed in the baking assembly such that said handle extends out therefrom.

20. A skewer as set forth in claim 19 including a retainer for retaining the piece of food against said elongated rod.

* * * * *